United States Patent [19]

Söderquist et al.

[11] 4,317,503

[45] Mar. 2, 1982

[54] SOUND INSULATING BUILDING ELEMENT

[75] Inventors: Jan Söderquist, Västra Frölunda; Stefan Einarsson, Lindome, both of Sweden

[73] Assignee: Ingemanssons Ingenjorsbyra AB, Gothenburg, Sweden

[21] Appl. No.: 95,387

[22] Filed: Nov. 19, 1979

[30] Foreign Application Priority Data

Nov. 17, 1978 [SE] Sweden ............................... 7811891

[51] Int. Cl.³ .................. G10K 11/00; E04B 1/82; B32B 3/12; B32B 5/08
[52] U.S. Cl. ...................................... 181/290; 52/144; 428/113; 428/118
[58] Field of Search .................. 181/210, 284–295; 52/144–145; 428/113, 116, 118

[56] References Cited

U.S. PATENT DOCUMENTS

| | | | |
|---|---|---|---|
| 3,698,145 | 10/1972 | Newman et al. | 52/144 |
| 3,985,198 | 10/1976 | Kurtze et al. | 181/290 X |
| 4,155,211 | 5/1979 | Saylor et al. | 52/145 X |

FOREIGN PATENT DOCUMENTS

| | | |
|---|---|---|
| 714399 | 11/1941 | Fed. Rep. of Germany . |
| 1070362 | 8/1953 | Fed. Rep. of Germany . |
| 1484001 | 11/1968 | Fed. Rep. of Germany . |
| 2012520 | 10/1971 | Fed. Rep. of Germany . |
| 893678 | 2/1944 | France ................................ 181/290 |
| 2088967 | 12/1971 | France . |
| 404616 | 8/1975 | Sweden . |

Primary Examiner—L. T. Hix
Assistant Examiner—Thomas H. Tarcza
Attorney, Agent, or Firm—Oblon, Fisher, Spivak, McClelland & Maier

[57] ABSTRACT

A sound insulating building element or structural member includes a plurality of parallel sheet elements of which a first, inner, thick element is stiff and has a plurality of internal cavities, a second, inner, stiff element is substantially pervious to air and connected to one main surface of the first, inner element, and an outer, impervious element is arranged at a small distance from the second, inner element in such a manner that substantially the entire outer element can oscillate freely in relation to the second, inner element, the other main surface of the first, inner element being connected to a sheet material having an E-modulus greater than $10^9$ and which can be substantially impervious to air, or similar to the second, inner element, can be pervious to air and be connected over an air gap to an outer substantially impervious sheet element.

13 Claims, 6 Drawing Figures

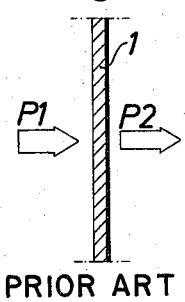
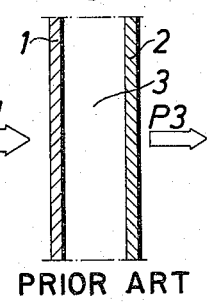
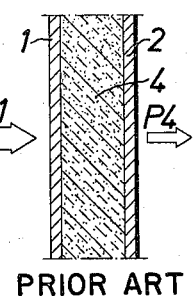
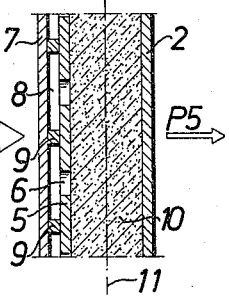
Fig.1 PRIOR ART
Fig.2 PRIOR ART
Fig.3 PRIOR ART
Fig.4
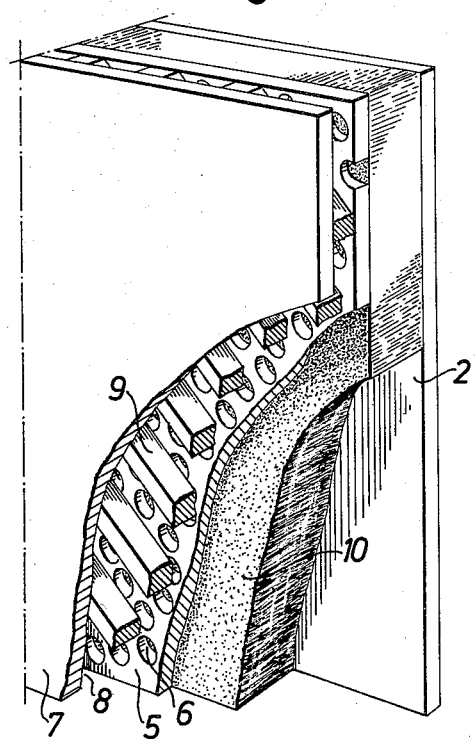
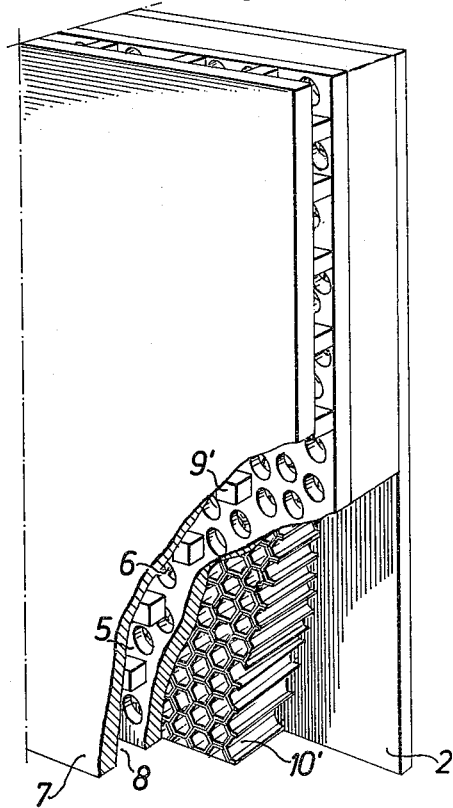
Fig.5
Fig.6

SOUND INSULATING BUILDING ELEMENT

BACKGROUND OF THE INVENTION

1. Field of the Invention

This invention relates to a sound insulating building element or structural member.

2. Description of the Prior Art

The insulation of an impervious sheet against air-born sound is mainly determined by the mass, i.e. weight per unit of surface, of the sheet.

A construction consisting of two impervious sheets spaced from each other by an air gap corresponds fundamentally to a mechanical oscillation circuit consisting of two masses interconnected by a spring. The broader the air gap the more resilient is the spring and the greater the sound insulating ability of the composite structure.

This mass-spring system has a marked resonance at a sound frequency, the so-called basic resonance frequency, which is determined by the mass per unit area of the sheets and the breadth of the air gap. At frequencies well below the basic resonance frequency the structure behaves as a single sheet having a mass and a stiffness equal to the total mass and stiffness of the two sheets constituting said structure. At frequencies well above the basic resonance frequency, however, the double-wall provides much higher sound insulation than a single sheet having said total mass. Within a frequency range near the basic resonance frequency the double-structure provides an inferior sound insulation and for this reason it is important to arrange for the basic resonance frequency being as low as possible, suitably below 250 Hz, preferably below 100 Hz. A considerable disadvantage with a double-wall of known construction having good sound insulating properties is that the stiffness and mechanical strength of said construction is very low in relation to the total thickness of the structure and often lower than the stiffness and strength of a homogeneous single sheet having the same weight per surface unit.

If the air gap of the structure having double sheets is substituted by a light but stiff material by means of which the sheets are interconnected, for instance by a binding agent, the stiffness and strength is radically increased, but simultaneously the sound insulation decreases, since the structure will function acoustically almost as a single sheet.

SUMMARY OF THE INVENTION

The present invention relates to building elements which combine high stiffness and strength with good insulating properties against air-born sound. A sound insulating building or structural element according to the invention is characterized by a first, inner, thick sheet element, which is substantially stiff or rigid, at least to forces directed transversely of the main surfaces of the element, such first, inner element having a large number of internal cavities, a second, inner, stiff sheet element, which is thin and substantially previous to air and has an E-modulus greater than $10^9$ and is connected to one of the main surfaces of said first, inner element, and an outer, substantially impervious sheet element situated near and at a small distance from the second, inner element, in such a manner that substantially the entire outer element can oscillate substantially freely in relation to the second, inner element, the second main surface of said first, inner element being connected to a sheet material having an E-modulus greater than $10^9$ and can be substantially impervious to air, or similar to the second, inner element, can be pervious to air and be connected over an air gap to an outer substantially impervious sheet element.

In the building element according to the invention the first, inner element and the elements having a high E-modulus and connected to each side of said first, inner element constitute together a basic element having a high stiffness, thus providing a building element having the desired strength and stiffness. The first, and preferably light, inner element can be constituted by a sheet or layer of mineral fibres, the main portion of the fibres extending substantially perpendicularly to the plane of the building element, but can also be constituted by a sheet of stiff plastic foam or the like having communicating pores, for instance polyurethane foam, or by a sheet or layer having a structure similar or analogous to a honeycomb structure. In the latter case the cavities in the honeycomb structure can be empty (filled with air) or be filled with any suitable porous material having communicating pores, suitably a resilient or soft material having a high sound absorbing ability, for instance resilient plastic foam.

The composite building element can be said to correspond to an I-beam, the first, inner element representing the web of the beam and the two sheets connected to each side of the first, inner element representing the flanges of the beam.

The cavities in the first, inner element, the total volume of which is suitably at least 90% of the total volume of the element, should communicate with the air passages in the air-previous sheet, so that the air in the cavities is utilized for the sound insulating function of the building element. In a mechanical oscillating circuit corresponding to the building element according to the invention the air in the cavities of the first, inner element is represented by a spring connected in series with the spring representing the air in the air gap between the air-previous element and the outer, impervious element. This air gap can be relatively narrow, generally at most 10 millimeters, suitably at most 5 millimeters.

It is an advantage if the first, inner element per se also has a high sound absorbing ability.

The outer impervious element can be connected to the air-pervious element by means of stiff or resilient spacing members, the latter being situated at a large distance from each other and occupying together a small surface as compared to the total surface of the building element. The connection can be provided spotwise or along connection lines. Between the points or lines of connection the air space can be empty or be occupied by a soft, porous air-pervious material, for instance a resilient plastic foam having open communicating pores. In the latter case one avoids inter alia direct contact between the outer element and the air-pervious element, for instance when the element is subject to outer pressure. It is also possible instead of by means of spacing members occupying together a small surface relatively to the total main surface of the building element to interconnect the outer, impervious element with the air-pervious element only by means of a thin layer of a porous, soft air-pervious material, for instance resilient plastic foam having open pores.

BRIEF DESCRIPTION OF THE DRAWINGS

Various other objects, features and attendant advantages of the present invention will be more fully appreciated as the same becomes better understood from the following detailed description when considered in connection with the accompanying drawings in which like reference characters designate like or corresponding parts throughout the several views and wherein:

FIGS. 1 to 3 represent known building elements,

FIGS. 4 and 5 represent a first embodiment of the present invention and

FIG. 6 represents a second embodiment of the building element or structural wall member according to the present invention.

DETAILED DESCRIPTION OF THE PREFERRED EMBODIMENTS

In FIG. 1 a known building element is shown consisting of a thin, single, stiff sheet or plate 1, which is tight or impervious, i.e. lacks through-going air passages in great number. The system is usually referred to as a light, single wall. In relation to the incoming sound P1 at one main surface of the element the outgoing sound P2 from the opposite main surface is only slightly lower in amplitude, which means that the sound insulating ability of the element is low or medium. A mechanical oscillating system corresponding to said element comprises substantially only a mass corresponding to the weight unit of surface of the element.

In FIG. 2 a wall system is shown which includes two thin, tight (impervious) plates or sheets 1 and 2 spaced by a gap 3, which is filled with air. This system corresponds to a mechanical oscillating circuit including two masses interconnected by a soft spring representing the air trapped between the plates. This double-wall element has a high sound insulating ability as compared with the single wall according to FIG. 1, i.e. P3 is substantially less than P1 at frequencies above the basic resonance frequency of the system. However, the stiffness and strength of the element is not satisfactory for many applications.

An improvement in the latter respect is achieved by the construction according to FIG. 3 in which the air space 3 has been sutstituted by a relatively thick layer or sheet 4 of stiff or rigid plastic foam to the main sides or surfaces of which tight, thin, stiff sheets 1 and 2 have been bonded. The system thus obtained corresponds to an oscillating system consisting of two masses interconnected by the parallel connection of two springs, one of which representing the air content of the plate 4 of foamed plastic and the other representing the plastic foam proper of said plate 4. The improvement in stiffness and strength is, however, connected with a deterioration of the sound insulating ability of the construction, i.e. P4 is not materially lower than P1, and this can be referred to the fact that the composite structure will in fact behave substantially as a stiff or rigid single plate.

In FIGS. 4 and 5 an embodiment of a representative section of a constructive or building element according to the present invention is shown, which element combines high stiffness and strength with high insulating ability to air-born sound. The element which can be used, inter alia as or in a wall structure, includes a first, inner, thick element 10 having internal cavities. In the embodiment shown this element consists of mineral fibres oriented substantially perpendicularly to the main plane of the element, but can also be constituted by a stiff, porous plastic or resin layer or sheet having communicating internal pores, e.g. polyurethane plastic foam, a honeycomb structure, as shown in FIG. 6, or the like. At one main side of the element 10 a thin, tight, stiff sheet 2 is bonded (glued), while a stiff sheet or plate 5 which includes a large number of suitably evenly distributed perforations 6 is bonded (glued) to the opposite side of the element 10.

By means of a plurality of spacing members 9 a thin, tight, outer sheet 7 is connected to the plate 5 via a small space or air gap 8, the thickness of which can be one or a few millimeters. The spacing members 9 are in the form of spaced ridges or strips evenly distributed over the main surface of the wall element, but they can also have other shapes, for instance be constituted by narrow, elongated or short members constituting connection zones or points at a large mutual distance. The connection between the spacing members 9 and the stiff sheet 5 and the sheet 7 can be effected for instance by glueing. The sheet element 7 can consist of an optional stiff or resilient material, preferably a material having a high density.

The mechanical oscillating circuit corresponding to the building element according to FIGS. 4 and 5 includes two masses corresponding to the sheets 2 and 7, such masses being interconnected by the series connection of a first spring corresponding to the air in the air gap 8 and a second spring corresponding to the air in the inner element 10, the internal cavities or pores of which communicating with the air gap 8.

The basic resonance frequency of the system is low and the sound insulating ability is good, i.e. P4 is much less than P1 within a wide range of frequencies. If the sheet 5 had been tight (impervious to air) only the narrow air gap 8 would have determined the basic resonance frequency which in such case would have been much higher.

As to the air-pervious, stiff sheet 5 it should be pointed out that even if illustrated in FIG. 4 as a metallic plate, such can be constituted by many alternative structures according to the existing requirements. It may for instance consist of plastic or resin, especially reinforced plastic or resin, a metal net etc.

In FIG. 6 another embodiment of the constructive element according to the invention is shown which differs from the embodiment according to FIGS. 4 and 5 therein in that the first, inner element 10 of the latter embodiment, which element consists of a layer of glass fibres, is substituted by a honeycomb structure 10', the cavities of which can be filled with air or a porous material having a high sound absorbing ability as mentioned before, and that the strips 9 according to FIGS. 4 and 5 have been substituted by short, discrete spacing members 9' evenly distributed over the main plane of the element.

For the element 2 as well as for the element 5 the E-modulus (as measured in the plane of the element) should be at least $10^9$ N/m$^2$, suitably at least $10^{10}$ N/m$^2$ and preferably at least $2 \times 10^{10}$ N/m$^2$. The thickness of the various sheets or elements of the structural wall member of the invention can be chosen within the ranges stated below, such ranges being valid especially in the case that the elements 2, 5 and 7 are made of metallic plate, for instance iron or steel plate.

Element 2: 0,5 to 5 millimeters, preferably 1 to 2 millimeters.

Element 5: 0,5 to 5 millimeters, preferably 1 to 2 millimeters.

Element 7: 0,5 to 5 millimeters, preferably 2 to 4 millimeters.

Element 10: 20 to 150 millimeters, preferably 25 to 100 millimeters.

If for the elements 2, 5 and 7 a lighter material than metal is used the thickness of the respective elements can be larger. This is true especially for the outer element 7, for which many different materials can be used. The element 7 can, for instance, consist of a plastic plate or particle board, thick paper or cardboard, fibre board, plaster board or gypsum plate, a flexible plastic film or foil, etc. The constructions shown in FIGS. 4, 5 and 6 are non-symmetrical, i.e. the two halves on each side of an intermediate plane 11 in FIG. 4 through the inner element and parallel to the main plane of the construction element are mutually fundamentally different. However, for certain applications a symmetrical construction can be preferable, i.e. a construction including two equal halves, one on each side of the intermediate plane, each of the halves being fundamentally equal to the part of the construction shown to the left of the intermediate plane 11 in FIG. 4.

The building element or structural member according to the invention can be used in various connections, for instance in or as a wall structure in buildings, ships, vehicles, apparatuses, machine installations etc., where good sound insulation and high strength are important requirements.

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. A sound insulating element comprising:
   a first plate element with two main surfaces which is substantially rigid, at least to forces being applied transverse to said two main surfaces, and including a plurality of internal cavities formed therein,
   a second substantially rigid plate element which is substantially pervious to air and is connected to one of said two main surfaces of the first plate element,
   a third plate element connected to the other surface of said two main surfaces of the first plate element, the second and third plate elements having an E modulus greater than $10^9$ N/m$^2$, and
   an impervious substantially rigid fourth plate element extending parallel to and spaced from the second plate element and connected thereto over a minor proportion of its surface area.

2. An element as claimed in claim 1 said third plate element comprising an element substantially impervious to air.

3. An element as claimed in claim 1 said third plate being substantially pervious to air and further comprising an impervious substantially rigid fifth plate element extending parallel to and spaced from the third plate element and connected thereto over a minor proportion of its surface area.

4. An element as claimed in claims 1 or 2 or 3, said first plate element comprising a layer of mineral fibres, the major proportion of which extend substantially perpendicular to the surfaces of first plate element.

5. An element as claimed in claims 1 or 2 or 3, said first plate element comprising rigid porous plastics material having intercommunicating pores formed therein.

6. An element as claimed in claims 1 or 2 or 3, said first plate element comprising a honeycomb structure.

7. An element as claimed in claim 3, said second element having a plurality of evenly distributed perforations formed therein.

8. An element as claimed in claims 1 or 2 or 3, further comprising a plurality of spacer members, said fourth plate element being connected to the second plate element by said plurality of spacer members spaced from each other such that said spacer members together have a surface area which is a small proportion of that of the plate elements to which they are connected.

9. An element as claimed in claim 8, further comprising a porous plastics material positioned between the spacer members.

10. An element as claimed in claims 1 or 2 or 3 further comprising a layer of soft porous plastics material, said fourth plate element being connected to the second plate element only by said layer of said porous plastics material.

11. An element as claimed in claim 3, said second and fifth plate elements having a plurality of evenly distributed perforations formed therein.

12. An element as claimed in claim 3, further comprising a plurality of spacer members, said fourth plate element being connected to the second plate element, and said fifth plate element being connected to the third plate element, by said plurality of spacer members spaced from each other such that said spacer members together have a surface area which is a small proportion of that of the plate elements to which they are connected.

13. An element as claimed in claim 3 further comprising a layer of soft porous plastics material, said fourth plate element being connected to the second plate element, and said fifth plate element being connected to the third plate element, only by said layer of soft porous plastics material.

* * * * *